United States Patent Office 3,404,251
Patented Oct. 1, 1968

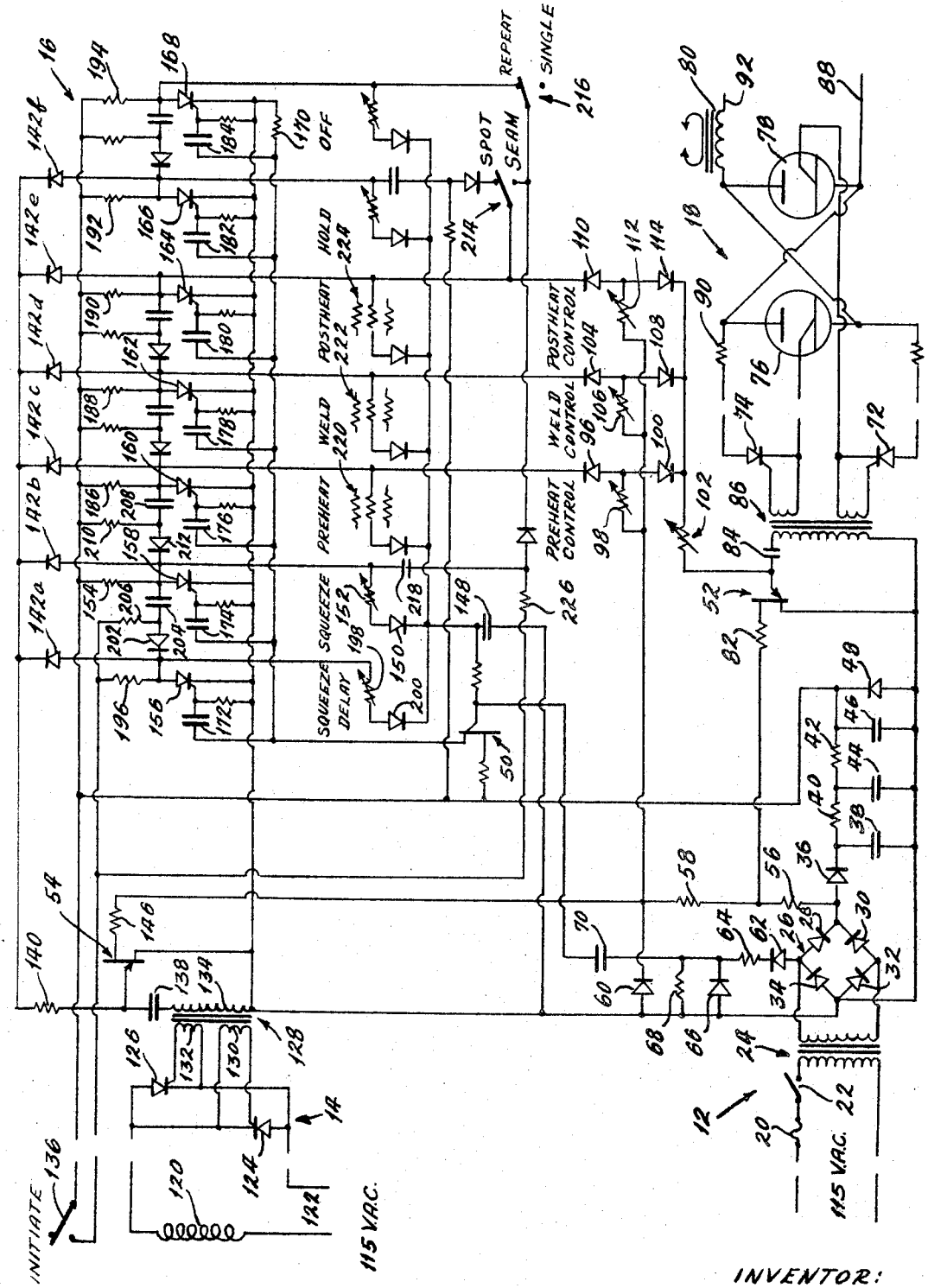

3,404,251
CONTROL CIRCUIT
Bobby Gene Hubbard, Florissant, Mo., assignor to Weltronic Company, Southfield, Mich., a corporation of Michigan
Filed Apr. 19, 1965, Ser. No. 449,206
9 Claims. (Cl. 219—108)

ABSTRACT OF THE DISCLOSURE

A control circuit for a process having a plurality of steps and employing controlled rectifiers in a counter arranged so that each of a plurality of the rectifiers control a step of the process. All but one rectifier of the counter is conducting in operation and the non-conducting rectifier is the active control element for the currently effective step. The active element affords a direct actuation of step controls. As applied to a welding control using silicon controlled rectifiers the interval of each process step is controlled from a unijunction transistor timer directly driven from the rectifiers and set to the interval defined by the active stage. Load circuits can be driven from each rectifier as with unijunction transistors as active elements. Welding sequences include a "squeeze delay," "squeeze," "preheat," "weld," "postheat," "hold," and "off" steps and selected combinations thereof.

---

The present invention relates generally to control circuits and the like and more particularly to a circuit for controlling the sequence, time duration and operation of plural operation devices such as devices for welding and for other purposes.

Many devices, processes, and systems function in a plurality of steps or operations the order or sequence of which is important as is the time allotted for each step or operation to take place. Furthermore, the order of the steps may vary under certain circumstances. Such devices, processes and systems often lend themselves to being controlled automatically. The present invention teaches the construction and operation of an extremely versatile yet relatively inexpensive control circuit which has broad applications but which will be described specifically in connection with a seam and spot welding apparatus. The subject circuit comprises means for controlling the order in which various operations take place, means for independently controlling the timing of each operation, means for controlling the manner in which each step is performed, and means for repeating all or any portion of a sequence. The subject circuit may also include means for modifying the order in which the steps or operations take place.

It is therefore a principal object of the present invention to provide versatile control means.

Another object is to provide means for controlling the operating sequence and the time duration of each step in the sequence.

Another object is to provide means for automatically controlling multi-step operations and processes.

Another object is to provide relatively inexpensive and compact control means.

Another object is to provide means capable of automatically controlling the operation of almost any number of steps.

Another object is to provide a control circuit which is particularly adaptable for controlling welding operations such as spot and seam welding operations.

Another object is to provide accurate and reliable control means which are relatively insensitive to spurious signals and the like.

Another object is to minimize waste and imperfections in processes having a plurality of steps.

Another object is to provide control means which can be operated and adjusted with a minimum of training and experience.

These and other objects and advantages of the present invention will become apparent after considering the following detailed specification in conjunction with the accompanying drawing which shows a control circuit for a welding device constructed according to the present invention.

Referring to the drawing more particularly by reference numbers, number 10 refers generally to a circuit constructed according to the present invention. The circuit 10 includes a power supply portion 12, an air solenoid control portion 14, a counter circuit 16, and a welding current output circuit 18.

The power supply 12 includes a suitable fuse 20, a switch 22 and an isolation transformer 24. The secondary of the transformer 24 is connected across the input terminals of a full wave rectifier circuit 26 which includes four diodes or rectifiers 28, 30, 32 and 34. The output terminals of the full wave rectifier 26 supply several different circuits, one of which includes diode 36 and capacitor 38. When operating, the capacitor 38 will charge and will feed a filter circuit which includes resistors 40 and 42 and capacitors 44 and 46. The output voltage of the filter circuit is regulated by a Zener diode 48 which is connected across the capacitor 46, as shown, and is provided to regulate the output voltage at some value such as at 30 volts. This regulated output is used to energize the counter circuit 16 including unijunction transistor 50, the operation of which will be described more in detail hereinafter. Another output of the rectifier circuit 26 is used to energize other unijunction transistors 52 and 54 as will be shown. This output includes voltage divider resistors 56 and 58 and is regulated or clipped by the action of Zener diode 60.

The rectifier circuit 26 also produces a half wave output which is fed through diode 62 and resistor 64 and is regulated by zener diode 66. These half wave pulses are used for synchronizing the timing circuit 16 to the line frequency. For example, when the voltage on the upper lead on the secondary winding of the transformer 24 is positive, current will flow through the diode 62 and the resistor 64 and also through another resistor 68 and back to the opposite side of the transformer secondary winding through the diode 32. The diode 62 does not, however, permit pulses to pass on alternate half cycles when the voltage on the upper lead of the transformer secondary is negative. The zener diode 66 maintains the half wave output voltage at a level somewhat below the voltage level of the output of the filter circuit as taken across the zener diode 48. The half wave output minimizes any effect on the counter circuit which might be caused by line voltage variations operating on the unijunction transistor 50. A coupling capacitor 70 is connected in the circuit between the output half wave supply circuit and the control electrode of the unijunction transistor 50. This enables alternating current pulses but not direct current voltages to be fed to the transistor 50 for synchronizing purposes.

The unijunction transistor 52 is in the heat generating or welding current circuit 18 and is provided to generate firing pulses for controlling the operation of silicon controlled rectifiers (SCR's) 72 and 74. The rectifiers 72 and 74 in turn control the firing of associated relatively high current ignitron tubes 76 and 78. The outputs of the ignitron tubes are connected in the circuit of a welding transformer 80 which in turn feeds a welding instrument (not shown).

A resistor 82 is connected in the power supply circuit to one of the electrodes of the unijunction transistor 52 as shown, and another electrode of the transistor 52 is connected to the common terminal of the circuit. The third or control electrode of the transistor 52 is connected to output circuits of the counter 16 as will be shown and also to one side of a capacitor 84, the opposite side of which is connected to the primary winding of a transformer 86. The transformer 86 has two secondary windings which are respectively connected in the circuits of the SCR's 72 and 74.

During operation of the subject device the capacitor 84 will be charged and discharged to control the operation of the SCR's 72 and 74, and hence also the operation of the welding transformer 80. As the capacitor 84 charges it will reach the firing voltage of the unijunction transistor 52 at which time the transistor 52 will conduct and in so doing will discharge the capacitor 84 through a circuit which includes the primary winding of the transformer 86. This induces a positive pulse in the gate circuits of both SCR's 72 and 74. Whichever SCR at that particular instant has a positive anode voltage will conduct and the other will not conduct. For example, if the voltage on lead 88 in the output circuit of the ignitrons 76 and 78 is positive at the particular instant that the capacitor 84 discharges, current will flow through resistor 90 and through SCR 74 in the circuit of ignitron 76. This same current will flow out the cathode of the ignitron 76 and back through the weld transformer 80 to output lead 92. At this instant while SCR 74 is conducting, SCR 72 will not conduct since at this time its anode is negative with respect to its cathode. On the succeeding half cycle, when the line voltage polarity is reversed the opposite condition to that described will exist and SCR 72 instead of SCR 74 will conduct and ignitron 78 will be the active ignitron. When current flows through the igniter of an ignitron tube this will fire the ignitron and cause it to conduct. Once an ignitron is fired current will then also flow through the weld transformer. As soon as an ignitron tube conducts, however, the voltage across its associated SCR will drop to around zero volts and in so doing will cause the SCR to stop conducting or reset in preparation for the succeeding half cycle when its anode will again become positive. The process is repeated first with one ignitron and then the other as the voltages on lines 88 and 92 alternately become positive. The welding transformer 80 at all times acts as a relatively low impedance while current is flowing through SCR's 72 and 74. It is important to note that the rate at which the capacitor 84 charges is determined by the setting of a control on a control panel. This controls the time during each half cycle at which the unijunction transistor 52 fires and in this way controls the amount of welding heat produced. If the controls are set so that the unijunction transistor 52 fires early in each half cycle a relatively large amount of heat will be produced, while if the control is adjusted so that the transistor fires late in each half cycle relatively little heat will be produced.

The resistor 82 in the input circuit of the transistor 52 is provided to bias the transistor 52 into an operating condition which assures that the capacitor 84 will completely discharge prior to the beginning of each new half cycle of operation. This assures that the conduction period during each half cycle will be the same. The capacitor 84 discharges at the end of each half cycle because at that time the full wave input drops to zero. It is a peculiar characteristic of a unijunction transistor to conduct between its emitter electrode and one of its base electrodes whenever the voltage on the other base electrode is at or near zero. This being so, the capacitor 84 will discharge at the end of each half cycle.

The full wave pulses fed to the unijunction transistor 52 through resistor 82 are taken from between the two resistors 56 and 58 instead of directly from the Zener diode 60. This means that an increase in line voltage will slightly increase the voltage on the second base electrode of the unijunction transistor 52. Another characteristic of unijunction transistors made use of is that they require a higher emitter firing voltage when the voltage on the second base electrode is increased. Therefore, if the line voltage increases and produces a slight increase in the voltage on the second base electrode, the transistor 52 will not be able to fire until the higher emitter voltage is obtained. This means that the amount of time that the transistor 52 will conduct increases when the line voltage increases. Increasing the time required to fire the unijunction transistor 52 therefore has the effect of reducing the heat that is applied. Another way to compensate for line voltage variations is to change the ratio of the resistances of the resistors 82 and 58.

When the subject control circuit is used with a welding instrument such as a seam welder, it controls the various operations which are performed by the welder including such steps as squeezing the welding head against the work, preheating the head and the work, bringing the head and work to welding temperature, keeping some heat on the work even after the welding operation is completed, holding the head against the work after the weld is completed so that the welded connection does not undergo premature strain, and releasing the head from the work. The subject circuit includes means for accomplishing all of these and other operations in a desired sequence and with a desired time for each operation. The preheat, weld and postheat steps all require the application of heat to the work and therefore also require that the weld control circuit 18 be used. These operations are also under control of various stages of the counter circuit 16 as will be shown. The preheat control for example, includes a diode 96 which operates in conjunction with a particular stage of the counter circuit 16. The preheat control diode 96 is capable of being in either a grounded or non-grounded condition depending on the condition of its associated counter stage. When the diode 96 is grounded through its corresponding counter stage the charging voltage for the capacitor 84 will be shorted to ground through a circuit which includes potentiometer 98 and the diode 96. When the diode 96 is not grounded, however, the same input charging voltage will be applied to charge the capacitor 84 through a circuit which includes diode 100 and a potentiometer 102 which is provided to adjust the power factor. Thus the welder device will be in a welding or heating condition when the diode 96 is not grounded through its associated counter stage to discharge capacitor 84, and will be inoperative when the associated diode 96 is grounded through its associated counter stage.

A similar circuit under control of a different stage of the counter circuit 16 is provided to energize the welding head during a welding operation, and still another circuit under control of a still different counter stage controls the energizing of the head during an optional postheat control period. The circuit stage which controls the welding head during the welding period is the fourth counter stage including associated diode 104, potentiometer 106 and diode 108. During the postheat control period the fifth stage of the counter circuit 16 takes over and controls the welding heat through other circuit elements including diode 110, potentiometer 112 and diode 114. It can thus be seen that the active counter stage is the one that is not conducting.

The counting circuit 16 is constructed so that only one of the heat controlled diodes 96, 104 and 110 is operative at any one time. This enables the counter circuit 16 to control the functioning and time duration of each step of a welding operation. The potentiometer 102 is common to all three welding heat control circuits just described and will effect the settings of the controls in these circuits. The main purpose of the potentiometer 102 is to provide means for calibrating the heat controls regardless of the type and thickness of metal to be welded. The potentiometer 102 also provides means for adjusting the power factor of the circuit for most efficient operation.

The air solenoid valve portion 14 of the circuit is provided to cause a welding head to be moved into and out of engagement with the work and also to apply pressure to the work during welding thereof. The solenoid valve portion includes solenoid coil 120 which is connected in an alternating current circuit having an alternating current source 122, silicon controlled rectifiers (SCR) 124 and 126, and transformer means 128 and associated windings 130 and 132, respectively. The transformer 128 also has another winding 134 which is connected in the circuit of the unijunction transistor 54. The transistor 54 generates impulses which fire the SCRs 124 and 126 to energize the solenoid coil 120. During a welding operation the coil 120 is energized as aforesaid to move the welding head into and out of engagement with the work. The solenoid means are energized at the beginning of each welding operation when initiate switch 136 is actuated and is de-energized when the operation has proceeded to the final or off stage, as will be explained hereinafter.

A capacitor 138 is connected in series with the transformer winding 134 and charges through a circuit which includes the winding 134, resistor 140, and through one of the diodes 142a through diode 142f in the counting stages. The capacitor charging current will be supplied through only one of the said last named diodes at any one time depending upon which stage of the counter circuit is the effective stage at that instant. When the capacitor 138 has been charged to the firing voltage of the unijunction transistor 54, the transistor 54 will conduct between its emitter and one of its base electrodes to discharge the capacitor 138 through the primary transformer winding 134. In so doing a positive impulse will be produced in the gate circuits of SCRs 124 and 126. Whichever SCR at that instant has a positive anode voltage will conduct. On alternate half cycles the other SCR will conduct. The resistance of the resistor 140 is selected to cause the firing impulse of the unijunction transistor 54 to occur at the beginning of each half cycle to assure full wave switching. The second base electrode of the unijunction transistor 54 is biased into an operating condition by full wave pulses which it receives from the output of the rectifier circuit 26 through the resistor 56 and 58 and through resistor 146. It is usually not necessary to compensate this circuit for line voltage variations since the current required to energize the solenoid coil 120 is not as critical as the currents used to energize other circuits.

The counter circuit 16 is provided to control the operating sequence of the welder or other device and also to allow any desired times for each function. In the particular embodiment of the invention disclosed, seven different operation functions are controlled by the circuit 16 including a squeeze delay function, a squeeze function, a preheat function, a weld function, a postheat function, a hold function and an off function. The squeeze delay function in a seam or spot weld operation is usually the first operation and is adjusted to allow enough time for the welding head to move from its inoperative position to a position engaging the work and pressing down on the work. The squeeze function can also be adjusted to have any desired time duration and is provided to control the time from when the head engages the work to when welding power is applied. The preheat function is an optional function which is provided to control the amount and intensity of heat first applied to the work and when included it conditions the work for the weld temperatures. The need for a preheat step usually depends on the type of metal to be welded. The main weld function follows the preheat step and is when full welding power is applied. The actual welding can be a series of spot welds, or a continuous weld operation while the welding head moves along a seam.

After the weld step, a postheat step is provided which takes place at a lower temperature than the weld step to allow the work to cool more gradually. During the postheat operation the head is usually still engaged with the work and under the same pressure as during welding. The postheat operation improves the quality of the weld and prevents cracking and other deterioration thereof.

Following the postheat operation, a hold step is provided during which the work is allowed to cool under pressure but without the application of more heat. The quality of a weld is usually improved by allowing it to cool while maintaining pressure thereon. When the hold operation is completed the head may be moved to another place and repeat the welding steps or an off operation may take place in which the welding head is disengaged from the work.

If the initiate switch 136 remains in its actuated condition at the conclusion of an off cycle, another welding operation will take place the way the circuit is shown. However, the succeeding operation will begin with the squeeze operation rather than with a squeeze delay operation. This is to save time because the weld head usually does not have as far to travel especially where the weld is a series of spaced spot welds. Where this is not true, however, it may be necessary to repeat the squeeze delay operation. Where a continuous seam is to be welded the head is energized to welding temperature while it is moved along the joint.

When the main switch 22 is closed the counter portion 16 of the subject circuit is energized by the output of the power supply section 12. At the same time, a capacitor 148 charges through a circuit which includes diode 150, potentiometer 152 and resistor 154 which is in the second stage of the counter circuit 16. The opposite side of the resistor 154 is connected to the 30 volt regulated output from the power supply section. The charge on capacitor 148 effects the operation of the unijunction transistor 50 as will be shown.

The particular form of counter circuit 16 shown in the drawing has seven similar stages each of which includes as its main element a silicon controlled rectifier (SCR) or similar device. The SCRs identified in their respective stages are identified by numbers 156, 158, 160, 162, 164, 166 and 168. As the charge on the capacitor 148 increases and combines with the charge on the capacitor 70, which is for synchronizing purposes, the combination of charges reaches the firing voltage for the unijunction transistor 50 causing it to conduct. When this happens a positive voltage is produced across resistor 170 which voltage is coupled to the control circuits of each of the counter SCRs respectively through capacitors 172, 174, 176, 178, 180, 182 and 184. This causes all of the SCRs except the first stage SCR 156 to go from a non-conducting to a conduction condition. SCR 156 is prevented from conducting because it does not have a 30 volt anode voltage applied to it at this instant as do all of the other SCRs which are connected to the 30 volt supply line through associated resistors 154, 186, 188, 190, 192 and 194, respectively. SCR 156 is prevented from having this anode voltage because at this time and until a welding operation is commenced the initiate switch 136 is open. When the switch 136 is closed, however, the anode of the SCR 156 will also receive a positive charge through its resistor 196. Until a succeeding pulse is received at the input of the counter circuit, however, the counter will remain in the condition described with the first stage in non-conducting condition and with all of the other stages conducting. The operation of the counter circuit per se is described in copending application Ser. No. 381,065, filed July 8, 1964 of the same inventor. It is important to note that all but the active stage of the counter circuit 16 are in a conducting condition at all times and this has important advantages from the standpoint of reliability because it means that random impulses caused by noise or other undesirable conditions will have minimum adverse effect on the operation which is not so of circuits where the reverse is true and all stages but the active stage are non-conducting. When the switch 22 is turned on the circuit for charging the capacitor 148 as already described is formed by similar parallel circuits associated with each of the several stages of the counter. This means that initially there is a relatively low impedance path for charging the capacitor 148 which assures that all of the counter SCRs will immediately conduct after the switch 22 is closed. Under this condition and before the initiate switch is actuated the circuit is in a standby condition in which no welding current can be applied inasmuch as the diodes 96, 104 and 110 in the ignitron control circuit are grounded through their respective SCRs 160, 162 and 164. Thereafter, as aforesaid when switch 136 is closed positive 30 volts is applied to the anode of the first stage SCR 156 through the resistor 196. The same positive voltage is also available to charge the capacitor 148 through a circuit which includes the squeeze delay potentiometer 198 and diode 200. When the charging voltage on the capacitor 148 reaches the firing point for the unijunction transistor 50, the transistor 50 will conduct and in so doing will produce a positive pulse on the control electrode of the first stage SCR 156. This voltage appears across the resistor 170 and the capacitor 172. This causes SCR 156 to conduct.

When SCR 156 conducts a discharge path formed by a diode rectifier 202 is established to discharge a capacitor 204 which is connected between the first and second stages of the counter circuit. Before the SCR 156 conducted, the capacitor 204 was charged through a circuit which includes resistor 206 and the second stage SCR 158. Thereafter, when SCR 156 conducts the capacitor 204 discharges and causes a negative potential to appear on the anode of the second stage SCR 158. This causes SCR 158 to go from a conducting to a non-conducting condition making it the active stage. It should be noted that a positive pulse is applied to the gate circuit of each of the SCRs at the time that the capacitor 204 discharges, but because the pulse width is relatively short compared to the capacitor discharge time the positive pulse cannot prevent the second stage SCR 158 from becoming non-conducting.

With SCR 158 non-conducting the capacitor 148 will recharge through a circuit which includes the second stage anode resistor 154, the potentiometer 152, and the diode 150. When the next input pulse is applied to the gates of all of the counter SCRs the third stage SCR 160 will go to a non-conducting condition since its associated coupling capacitor 208, which was previously charged through resistor 210, will discharge through now conducting second stage SCR 158 and through isolating diode 212. The process will continue step-by-step until the last or final SCR 168 is transferred to its non-conducting condition assuming that control switch 214 is in its position marked "spot" indicating its position for spot welding, and assuming also that switch 216 is in its position marked "single" indicating a single spot weld is to be made. If the switch 216 is in the position marked "repeat" then capacitor 218 which is in the second stage counting circuit will be discharged across the second stage SCR 158 when the next input impulse is received to cause the seventh stage SCR 168 to again conduct. This has the effect of changing the second stage SCR to its non-conducting condition so that the welding steps will be repeated beginning with the second or squeeze stage. Under these conditions the first stage SCR 156 will remain in its conducting or non-operating condition until such time as a new weld operation is initiated.

The isolation diodes 202, 212 and so on between the adjacent stages may be selenium diodes characterized by having impedance as well as rectifying properties or they may be silicon diodes. If silicon diodes are used it is usually desirable to connect a resistor in series with each to improve the operation. This is done to prevent parallel discharge circuits through adjacent counter stages which might otherwise cause more than one stage to be cut off at a time. For example, when the capacitor 204 between the first and second stages discharges through the first stage SCR 156 and causes the second stage SCR 158 to go from a conducting to a non-conducting state, another discharge path is also provided through the elements 208 and 212 across the third stage SCR 160. Even though the capacitor 208 does not have a charge at this instant it still may act as a low impedance path. However, with the impedance in series with the isolation diodes the third stage SCR 160 does not receive as much turn off voltage as the second stage SCR 158. Therefore, the resistance in series with the diode 202 does not hinder the cutting off of the SCR 158 when SCR 156 conducts but the resistance in series with the diode 212 is sufficient to prevent the SCR 160 from being cut off at the same time.

During a welding sequence the capacitor 148 charges through a circuit which is established through one of the circuit stages at a time. This means that each individual operating interval is completely independent of the operating intervals of the other stages and can therefore be controlled by its own individual control elements. In terms of the operation this also means that each step can be individually adjusted to take as little or as much time as desired, and each heating step can also be adjusted to have any desired temperature. For example, the preheat cycle is controlled by the setting of potentiometer or resistor switch 220, the weld step is controlled by the setting of the potentiometer or resistor switch 222, and the postheat step is under control of the potentiometer or resistor switch 224. However, because of the way the counter circuit is constructed only one of the steps can be operative at any time which means that only one of the counting circuits SCR can be non-conducting at any one time. It is possible, however, to modify the counting circuit to have more than one counter stage simultaneously in a non-conducting or operating condition. This is possible only if the non-conducting SCRs are in non-adjacent circuit stages. This is disclosed in copending application Ser. No. 381,065.

Whenever the initiate switch 136 is turned off either after completion of a welding operation or at some intermediate time, the first stage SCR 156 will immediately become non-conducting and all other stages will conduct. This is the reset condition. Opening the initiate switch 136 also removes the charging voltage on the capacitor 218 in the second stage circuit and which is charged through a circuit which includes the initiate switch 136 and a resistor 226. This means that second stage SCR 158 will not go into non-conducting condition when the seventh stage SCR 168 next goes from its non-conducting to its conducting condition and hence the welding operation will terminate after the sequence which is taking place is completed. Thereafter the circuit will be in a standby condition until the initiate switch 136 is again closed to reinitiate a total operation commencing with the first stage squeeze delay operation.

The subject control circuit is selectively adaptable for seam welding as well as for spot welding operations. In a seam weld operation the last two steps in the operating sequence, namely the hold and off steps, are omitted and the circuit will cause the welder to repeat steps 2 through 5. In seam welding the welding head remains engaged with the work at all times until the initiate switch 136 is opened. The last two stages are omitted in a seam welding operation by having the switch 214 in its seam position which means that when the fifth stage SCR 164 conducts after its operating cycle it will cause the second stage SCR 158, instead of the sixth stage SCR 166, to go into a non-conducting condition. Under these conditions, the first, sixth and seventh stages will remain in their conducting condition and therefore will not effect the total operation except at the beginning and end thereof.

Thus it can be seen that the subject circuit not only provides extreme versatility and flexibility for spot and seam welding operations but also has applications to many other devices and processes where it is necessary to control a series of operating steps. The present device also lends itself to relatively inexpensive and compact construction preferably using mostly semi-conductor components for the principal circuit elements. The subject device also provides full individual control of each operating step and can be constructed to enable more than one step to take place at a time if desired. The order and number of steps can also be varied. The subject circuit with slight modification can also be made to operate in forward as well as in a reverse operation sequence.

In the drawing certain of the leads are shown as being discontinuous. This is done to identify certain elements and circuits which normally would be electrically connected but mechanically or physically separated.

Thus there has been shown and described a novel control circuit which fulfills all of the objects and advantages sought therefor. Many changes, modifications, variations, alterations, and other uses and applications of the subject device will, however, become apparent to those skilled in the art after considering this specification and the accompanying drawing. All such changes, modifications, variations, alterations, and other uses and applications which do not depart from the spirit and scope of the invention are deemed to be covered by the invention which is limited only by the claims which follow.

What is claimed is:

1. Means for controlling a welding process which includes the steps of controlling the operating position and the operating condition of a welding instrument including the steps of moving the welding instrument into and out of engagement with work to be welded, and means for energizing the welding instrument to produce a predetermined temperature condition thereof, said control means comprising a counter circuit having a plurality of stages each of which is capable of controlling at least one step of the welding process, each stage of said counter circuit being capable of being in a conducting or in a non-conducting condition, means for energizing said counter circuit including means to cause all but at least one of said circuit stages to simultaneously be in conducting condition, said non-conducting stage being the operating stage, other means for energizing said counter circuit to cause a different stage to become the non-conducting stage and so on in a predetermined sequence until a welding process has been completed, first adjustment means associated with each counter stage to control the time duration when that stage is in its operating condition, second adjustment means associated with each stage to control the operating conditions of the welding instrument during the time interval when that stage is in its operating condition.

2. The means for controlling a welding process defined in claim 1 wherein said counter circuit includes seven stages including a squeeze delay stage wherein the welding instrument is moved into engagement with a member to be welded, a squeeze stage wherein the welding instrument is moved against the member to be welded under predetermined pressure, a first heating stage wherein the welding instrument is energized to produce a first heat condition, a welding stage wherein the head is energized to a predetermined welding temperature, a postheat stage wherein the welding instrument is energized to a temperature less than the welding temperature to partially cool the work being welded, a hold stage wherein the welding instrument is maintained under pressure against the work for a predetermined time interval after the heating stages are completed, and an off stage wherein the welding instrument is moved out of engagement with the member that has been welded.

3. The means for controlling a welding process defined in claim 2 wherein means are provided for energizing the counter circuit to repeat the operations of preselected stages.

4. The means for controlling a welding process defined in claim 2 including switch means operable to select between a spot weld process and a seam weld process.

5. Means for controlling a process having a plurality of operating steps comprising a plurality of controllable rectifier devices connected in adjacent circuit stages, each rectifier device having anode, cathode and control elements, said rectifiers being capable of being in a conducting or non-conducting condition; means for simultaneously energizing a plurality of said rectifier devices to cause said rectifiers to be in their conducting conditions; means to prevent one of said rectifier devices from conducting; coupling means includes a diode and a capacitor in series connected between the anode elements of the controllable rectifier devices in adjacent circuit stages, said capacitor being connected to be charged by the voltage on the anode of the rectifier to which it is connected whenever said rectifier device is in a conducting condition, said diode being connected to discharge said capacitor through the non-conducting rectifier each time the non-conducting rectifier is actuated from a non-conducting to a conducting condition; an advance circuit coupled to said control element of each of said rectifier devices; a plurality of circuits each for controlling an operating interval of said process and each connected to said anode of a respective controllable rectifier device; a diode in certain of said controlling circuits poled to pass current from said anode element; a variable resistance in certain of said controlling circuits; a capacitance coupled to each of a plurality of said variable resistances to charge at a rate according to the value of said resistance coupled to said rectifier device which is in the non-conducting condition; and means responsive to a predetermined charge level on said capacitance to apply an advance signal to said advance circuit.

6. A combination according to claim 5 including a plurality of utilization circuits each for controlling an operating step of said process and each connected to said anode of a respective controllable rectifier device; a diode in each of said utilization circuits poled to pass current from said anode element; and a load in each of said utilization circuits responsive to a positive signal to actuate a control function of the respective operating step of said process when said controllable rectifier device associated therewith is in a non-conducting condition.

7. A combination according to claim 5 including a utilization circuit for controlling an operating step of said process connected to said anode of a respective controllable rectifier device; a first diode having its cathode terminal connected to said anode element; a second diode having its anode terminal connected to the anode terminal of said first diode; a source of unidirectional current having its positive terminal connected to the junction between said first and second diodes; and a load element connected to the cathode terminal of said second diode whereby current is passed through said first diode when said controllable rectifier device associated therewith is in a conducting state and through said second diode to said load element when said controllable rectifier device associated therewith is in a non-conductive state.

8. A combination according to claim 7 wherein said controlled process is a resistance welding process and including a variable resistance between said source and the junction between said first and second diodes; and said load includes a unijunction transistor phase control firing circuit.

9. A combination according to claim 5 including means to connect selectively the anode elements of said rectifier devices through said coupling means for automatically repeating selected ones of the operating stages.

References Cited
UNITED STATES PATENTS

| | | | |
|---|---|---|---|
| 2,625,651 | 1/1953 | Schmidt | 219—108 |
| 2,835,851 | 5/1958 | Collom | 219—114 |
| 3,267,303 | 8/1966 | Meyer | 307—141 |

RICHARD M. WOOD, *Primary Examiner.*

P. W. MAY, *Assistant Examiner*